Patented Apr. 3, 1951

2,547,087

UNITED STATES PATENT OFFICE 2,547,087

SURFACE PLATE AND THE LIKE

Lowell H. Milligan, Worcester, Mass., assignor to Norton Company, Worcester, Mass., a corporation of Massachusetts Application January 26, 1951, Serial No. 208,023
In Canada January 23, 1947

6 Claims. (Cl. 33—174)

1

The invention relates to surface plates for use in gauging and the like. This application is a continuation in part of my copending application Serial No. 686,735, filed July 27, 1946, which is now held abandoned.

One object of the invention is to provide a superior surface plate, which has a plane surface accurate to plus or minus half a ten thousandth of an inch in every direction for a distance of up to six inches from a given point. Another object is to provide a surface plate which will outlast other surface plates. Another object is to provide a hard accurate surface plate which will not scratch gauges or other articles with which it is used. Another object is to provide a surface plate which may be easily cleaned. Another object is to provide a surface plate which will not corrode and which is not affected by acid, bases, alkalis, salts or water. Another object is to provide a surface plate which will not bend or warp and which is strong enough to withstand ordinary usage. Another object is to provide a surface plate with one or more of the above advantageous features and which is of moderate weight. Another object is to provide a reflective surface plate so that measurements may be readily taken with an optical flat.

Another object of the invention is to provide an accurate anvil of great hardness and wear-resistance. Another object is to provide accurate and wear-resistant plattens for belt sanding machines and the like. Another object is to provide a highly accurate and wear-resistant surface to be used as a master.

Another object is to provide a surface plate of high quality at a reasonable cost.

Other objects will be in part obvious or in part pointed out hereinafter.

In the accompanying drawings illustrating two of many possible embodiments of the invention, Figure 1 is a photomicrograph of the surface of a vitrified bonded aluminum oxide plate after pressing and vitrifying, magnified 20 diameters.

Figure 3 is a photomicrograph of the surface of a plate like that of Figure 2 after lapping with

2 successively finer sizes of diamond abrasive, magnified 20 diameters.

Figure 3:
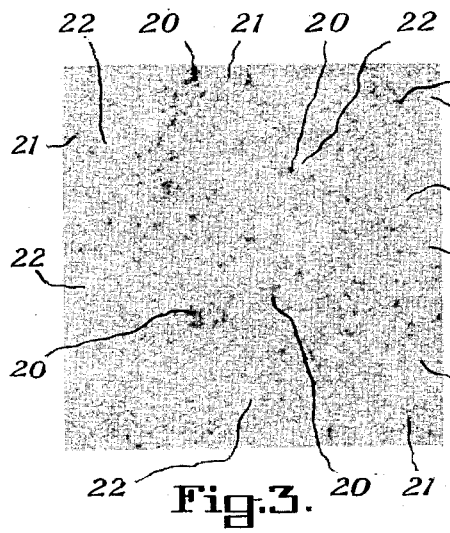
Figure 4:
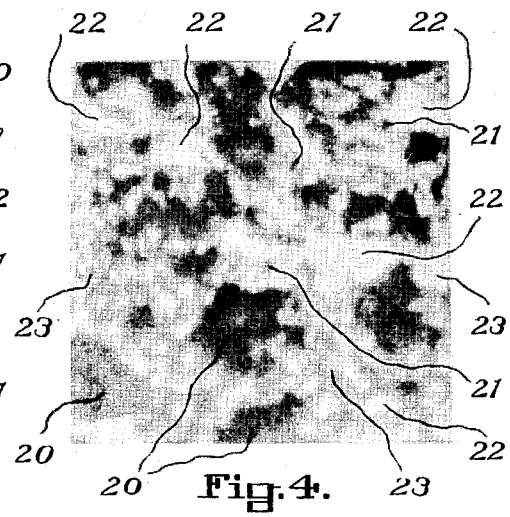

Figure 4 is a photomicrograph of the surface of a plate like that of Figure 3 also after lapping with diamond abrasive but magnified 275 diameters.

Figure 5:
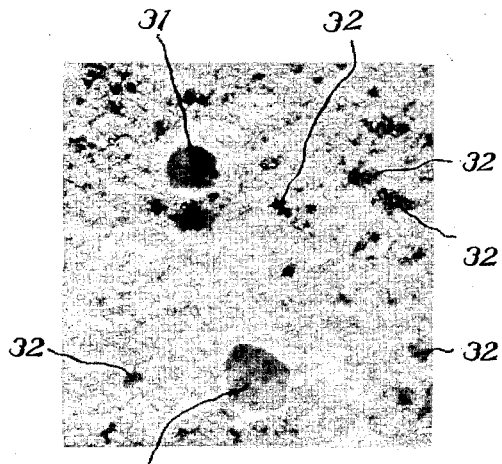

Figure 5 is a photomicrograph of the surface of a vitrified bonded silicon carbide plate after pressing and vitrifying, magnified 20 diameters.

Figure 6:
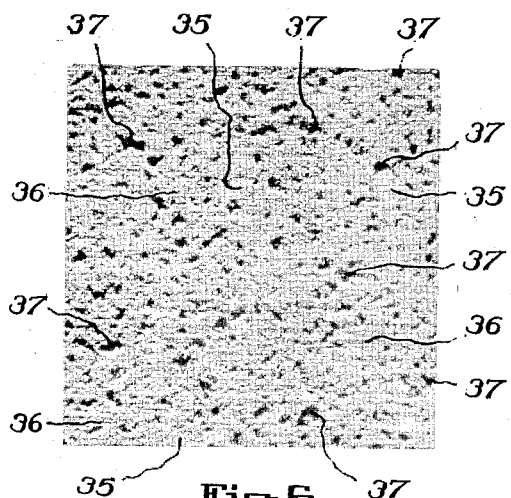

Figure 6 is a photomicrograph of the surface of a plate like that of Figure 5 after grinding with a vitrified bonded diamond wheel, magnified 20 diameters.

Figure 7:
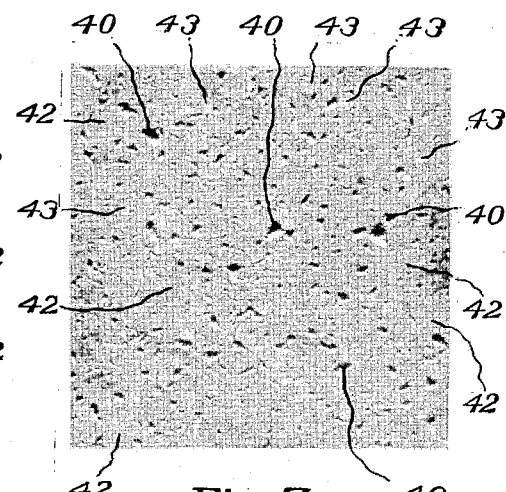

Figure 7 is a photomicrograph of the surface of a plate like that of Figure 6 after lapping with successively finer sizes of diamond abrasive, magnified 20 diameters.

Figure 8:
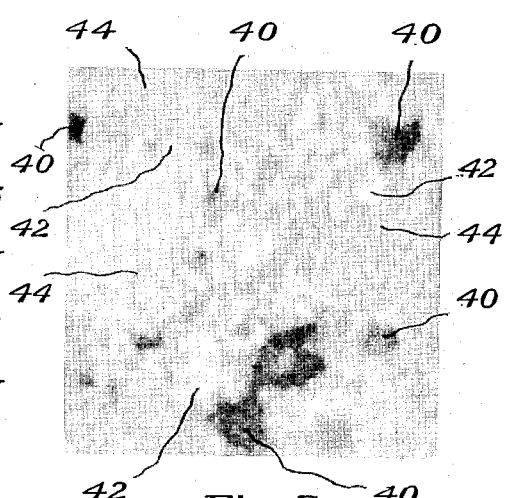

Figure 8 is a photomicrograph of the surface of a plate like that of Figure 7 also after lapping with diamond abrasive but magnified 275 diameters.

In all of these figures except Figure 4 and Figure 8 which are at high magnification, the lighting was oblique to the surface and the observation was perpendicular to the surface. In Figures 4 and 8 both the illumination and the observation are inclined to the surface, the angle of incidence of the illumination being equal to the angle of observation so that bright reflections are obtained from the plane flat areas of the surface. In all of the figures the photographs are placed so that the light comes from the top.

In carrying out the invention there is first provided a quantity of hard granular material. I use materials which are those normally classed as abrasive, such as aluminum oxide, particularly the fused product of the electric furnace, and silicon carbide. Fused aluminum oxide (otherwise called fused alumina) is a hard substance having a hardness of or just above 9 on Moh's scale, while silicon carbide has a hardness greater than that of fused aluminum oxide, i. e. substantially above 9 on Moh's scale. On this scale the hardness of the diamond is given as 10, but it is now well recognized that the gap between 9 and 10 is large, being greater than between any two successive numbers on the scale from 1 to 9 and probably greater than the gap between 1 and 5 on the scale or between 5 and 9 on the scale.

The granular abrasive materials which are included by the above definition include, besides fused aluminum oxide and silicon carbide, sapphire, ruby and corundum (all three being forms of aluminum oxide) also emery, which is an impure natural form of aluminum oxide. These materials are recognized as having a hardness of 9 or more on Moh's scale.

The grit size of the hard material may vary widely but at present I prefer the finer grits, in aluminum oxide for example 200 and finer grit sizes are satisfactory for many purposes. However, where the larger granules themselves are strong enough and sufficiently free from cleavage planes tending to make them break or otherwise spall off objectionably, then considerably coarser grit sizes may be employed, such as No. 14 grit size or even coarser. Coarser sizes form larger single hard areas in the surface of the product, which are anchored more deeply into the structure because of the larger grain diameter.

I provide further a quantity of vitrifiable bond. This may be ceramic material, such as clay, or a mixture of clays, oxides, silicates, etc. For example a mixture of Albany slip clay, ball clay and flint may be used. A usable mixture of these constitutes 48 parts by weight of Albany slip clay, 18 parts by weight of ball clay and 34 parts by weight of flint. I may also use a frit, which is a glassy, vitreous, or porcelanic material which has been fused, cooled and then crushed. Frits are made from glasses, glassy mixtures, clays and the like.

I may use a combination of two or more frits, or one or more frits in combination with a clay or clays, including the fluxing agents such as feldspar.

In general the vitrifiable bond is usually, after vitrification, a combination of oxides. The predominant oxide may be silica in which case the bond may be termed a silicate. However the soluble silicates, such as sodium and potassium silicate are to be avoided except in minor proportions.

Other mineral substances which can be had in granular powder or plastic form and which can be partially fused in a kiln so as to bond the hard granular material but not to cause slumping (in other words the total combination having no sharp melting point) may be used. The bond composition chosen should be adapted for satisfactory bonding of the abrasive granules selected. For oxidizable granules it may be desirable to mature the bond by firing in an inert non-oxidizing atmosphere, or perhaps a reducing atmosphere.

Figure 1:
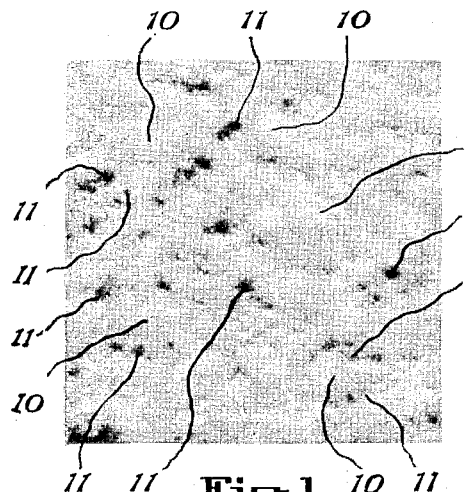

As specific illustrative examples I will first describe the manufacture of the plate of Figure 1 and then the manufacture of the plate of Figure 5, and after that I shall describe the creation of the surfaces thereof.

Taking 3043 grams of fused aluminum oxide, regular variety, in grit size 200 and finer, I mix this with 3422 grams of vitrifiable bond made up from 48 parts of Albany slip clay, 18 parts of ball clay, 34 parts of flint, all by weight.

The granular aluminum oxide is first put into a mixing machine of conventional type, water is added to wet all of the granules, and then the bond, which is a dry powdered mixture, is sifted in while the mixing is continued until all of the granules are coated with bond and no free bond remains. A mold is then charged with a quantity of such mixture and the mixture is pressed under a pressure of around two tons or more to the square inch of surface area. The mold is of such shape as to produce a body with at least one flat surface; preferably the body is a geometrically true cylindrical disc.

The body is stripped from the mold and after drying is put in a kiln and vitrified at Orton cone No. 12. The surface of such a fired plate is shown in Figure 1. However for a gauge, the mold should be such as to produce a cylinder, the length of which is of the order of its diameter or longer; for an anvil the shape may be varied provided there is one geometrical surface, usually a plane.

As an example of the manufacture of the plate of Figure 5, I provide 4300 grams of 100 grit size silicon carbide with 1346 grams of silicon carbide about 500 grit size, and 4470 grams of a glassy type bond made according to U. S. Letters Patent No. 2,332,241. The mixing, pressing and stripping procedure is the same, the pressure being about 2.5 tons to the square inch. This plate also may be vitrified at Orton cone 12.

The surface of the first plate as it came from the kiln is shown in Figure 1 in magnified plan view. It was a disc 9.25" in diameter by 1.5" in thickness. The second plate, similarly shown in Figure 5 was a disc 14" in diameter by 1.25" in thickness with an 8" central hole. Following the manufacture of the plates of Figures 1 and 5 the next step is to grind them. While many different machines might be used I find the most practical machine for the purpose is a surface grinding machine with a rotating table on a vertical spindle. Such machines are readily available on the market so I shall not describe them in detail. Suffice it to say that such machines have a reciprocating ram carrying a spindle for mounting a grinding wheel, the ram and the spindle reciprocating horizontally along the axis of the spindle. Such machines also have a vertical spindle which however can be inclined by a measured angle to the vertical, and a rotary table mounted upon the spindle to which a work piece can be clamped. I mount the circular plate of Figure 1 or Figure 5 on the rotary table of such a machine with the axis of the plate coincident with the axis of the spindle holding the table. I prefer to adjust the spindle for the table so that its axis is very slightly more than 90° to the axis of the spindle for the grinding wheel. The purpose is slightly to dish the work piece by an amount of the order of from one quarter of a thousandth to one thousandth of an inch.

I prefer to use a diamond grinding wheel. While some results at least on the aluminum oxide plate of Figure 1 might be achieved, for example, with a silicon carbide grinding wheel much better results are achieved by using a diamond wheel. While the diamond wheel might be bonded with resinoid or with vitrified bond I prefer the use of a metal bonded diamond grinding wheel because it holds its shape for a long time and the wheel wear is low.

The grinding operation is continued until the entire area of the plate is ground. The result of the grinding operation is shown in Figures 2 and 6.

Referring now to Figure 1, which shows the surface of a vitrified bonded aluminum oxide plate after pressing and vitrifying, the surface is rough consisting of rounded hills 10 and valleys 11.

Figure 2:
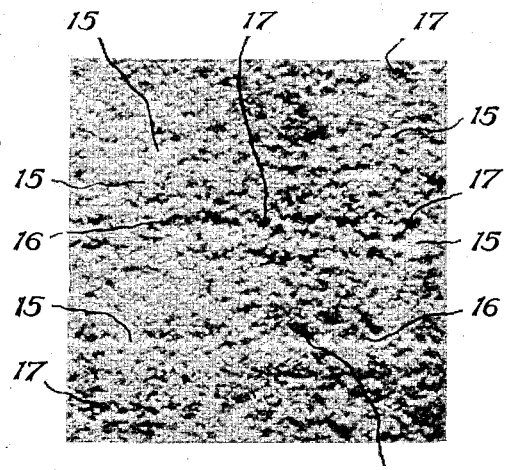
Figure 2 is a photomicrograph of the surface of a plate like that of Figure 1 after grinding with a vitrified bonded diamond wheel, magnified 20 diameters.

Referring now to Figure 2, the surface has been much improved. It is not so bumpy or hilly. There are many generally flat areas 15 which have been ground. However distinct grinding lines 16 can be observed. These lines go in the direction of across the paper. In these grinding lines 16 and elsewhere may be seen some pits 17.

Referring to both of Figures 1 and 2 although the material is a two phase material this is hard to discern. The appearance is substantially that of a single phase material due to the fact that the color of the bond is about the same as that of the aluminum oxide and the grinding has ground both phases. While experts may be able to make out occasional pieces of aluminum oxide I have not deemed it practical to try to point out any. In general it may be stated that the fairly flat surfaces 15 include both aluminum oxide and bond.

The next step is lapping. This is done with an abrasive of greater hardness than the abrasive granules in the plate. To get a maximum speed of cutting and production of a plane surface on the abrasive granules, it is desirable to have as great a differential as possible between the hardness of the abrasive granules in the plate and the lapping medium employed. For this reason, although it is perfectly possible in the case of crystalline alumina granules in the plate to employ such lapping mediums as silicon carbide or boron carbide, I prefer to use diamond, in order to achieve maximum rate of cut. Furthermore, with diamond, because of its great hardness, the abrasive granules and the surrounding bond are cut with nearly equal ease which is a help in readily attaining flatness.

Diamond grit is available in many different grit sizes, ranging all the way down to 1500 grit size and finer. To obtain the best results I do a series of lapping operations starting with the coarser grit of diamonds for example around 320 grit size and ending with the finer diamond grit for example around 1500 grit size and then I follow this with a final lapping operation in which no diamond or other grit is used, two plates being run together using gasoline as a lubricant.

The lapping may be done on a flat lapping machine many of which are available on the market. A species of flat lapper known as a universal machine can be used. Such machines have a rotary table and a platten above the table which can be lowered into contact with it or with a work piece held by it and which platten has a universal movement but does not rotate. The support for the platten can be swung so as to carry the platten to the center of the table and beyond it on either side.

To perform a lapping operation according to this invention I select three or more ground plates such as are represented by Figure 2 or by Figure 6. I use two of these as initial work pieces. One of them is fastened to the rotary table of the lapper, and the other is fastened to the platten of the lapper, the surfaces to be lapped being towards each other. Each one of the several lapping operations involves rotary motion of the lower work piece with the upper work piece held stationary, that is, not rotating but resting upon the lower work piece against which it presses with a pressure due to its own weight plus that of the holding platten to which it is attached. The upper work piece is fixed in a position eccentric to the lower work piece. In the presence of the lapping medium this produces a lapping action. The work piece plates should be removed from time to time and checked for straightness. It will be remembered that they were dished about one quarter of a thousandth at the start. To correct this concavity, the axes are brought close together at the start of the first lapping operation. To correct convexity, the axes of the plates are moved farther apart. The axis of the upper plate, however, should never be more than halfway out on a radius of the lower plate.

In practice a number of plates of the same size are selected, this number being in excess of two, for example, in one particular operation there were nine plates. Assuming these plates were marked for identification A, B, C, D, E, F, G, H, I, in each lapping operation different pairs would be worked together, for example A with C and D with H, then A with B and H with I, then C with F and G with D until each plate had been lapped against several different plates. Each plate is checked from time to time and a straight edge may be used. With a very accurate steel straight edge and a fluorescent light placed low behind the straight edge any concavity, convexity or unevenness is readily apparent. The eye can discern in this way a space which is only a few wave lengths of light deep. Of course there are many pits 17 in the ground plate of Figure 2, but these lie below the general level and after some lapping has been done they will not interfere with straight edge examination.

In a typical operation producing 15″ diameter aluminum oxide surface plates there were nine plates being ground and lapped. These were first ground on the surface grinding machine described and it took eight hours to grind the nine plates. The setup of the machine was as already described, the grinding wheel was a metal bonded diamond wheel, the table rotated at about 120 R. P. M. and the traverse of the ram was about five feet per minute.

Using mixtures of light mineral oil and diamonds these plates were lapped together in the manner described as follows: The rough lapping operation utilizing No. 320 grit size diamonds took five hours and 56 minutes for the nine plates. The second lapping operation utilized diamonds of 500 grit size and took four hours and 20 minutes for the nine plates. The third lapping operation using 800 grit size diamonds took four hours. The final lapping operation utilizing diamonds of 1500 grit size took seven hours and 50 minutes. After each particular lapping operation the plates were carefully cleaned to remove the grit. After the final lapping operation the plates were again cleaned. Then the plates were polished using the same machine and the same procedure except that no diamonds were used and the plates were wet with gasoline. This took eight hours for the nine plates. It has been found that this final operation practically removes all scratches.

In another typical series of operations for the manufacture of 9″ surface plates of aluminum oxide there were again nine plates each 9″ in diameter and the sequence of operations was the same and the grit size of the diamonds was the same, the grinding took nine hours, the lapping with 320 grit took 11½ hours, lapping with 500 grit took 4½ hours, lapping with 800 grit took four hours, lapping with 150 grit took five hours. The polishing with gasoline occupied seven hours.

The result of the lapping operation and the polishing operation is shown in Figures 3 and 4 which are photomicrographs of the same kind of surface but at the different magnifications specified. In Figure 3, 20 diameters, there are visible many pores. Large pores 20 can be discerned and small pores 21 can readily be made out. It is not practical to try to number all the pores and there is no sharp division between the large pores and the small pores. There are many flat polished level places of equal altitude 22 which are lighter in color and which form the bearing surface. Even these may have a fine porosity but the high places 22 are all flat and of equal altitude.

This is further brought out by Figure 4 at higher magnification and with different illumination where the high places 22 are now clearly apparent. The pores 20 and 21 are the dark masses in the photomicrograph. The white areas in the photograph are highly reflective and represent the extent of the truly flat portion of the surface that represents its contacting areas with an opposing surface. The small areas that are gray in the photograph represent tiny depressions 23 or small surface pores that are not quite up to the level of the bright highly-reflective plane areas.

The procedure for surfacing plates made of bonded silicon carbide is substantially the same and therefore need not be repeated in detail. The same grinding operation and the same lapping operations with the same grit sizes of diamonds and the same light mineral oil were used. This was followed by the same polishing operation with gasoline.

The photomicrographs of the silicon carbide plates however have a somewhat different appearance as is readily apparent. Figure 5 shows the rough unground plate of bonded silicon carbide. It is really rough to the naked eye without any magnification. In Figure 5, two large craters 31 are readily discernable. Some smaller depressions 32 are also plainly evident.

Figure 6 shows a similar plate after the grinding operation. There are many generally flat places 35 of nearly equal altitude. Grinding lines 36 which go across the paper can be readily picked out. Many pores 37 are also evident.

In Figure 7 pores 40 are well shown. The greater part of the area of the lapped and polished surface of Figure 7 however is composed of flat areas of equal altitude 42. These are everywhere. An interesting thing in connection with Figure 7 is that individual pieces of silicon carbide 43 can readily be picked out. These are light in color and are in the highly polished flat surfaces 42 of equal altitude.

Figure 8 shows the lapped and polished silicon carbide plate under higher magnification and with different illumination. The pores 40 are clearly visible and so are the flat areas 42 of equal altitude. The reflectivity of the different constituents present in the surface of Figure 8 varies somewhat, which accounts for the fact that some of the reflective areas look whiter than others. The small surface depressions or tiny surface pores that are not quite up to the level of the true surface appear as gray mottling 44 in Figure 8.

In the final product of Figures 3 and 4, 7 and 8, the surfaces of equal altitude are accurate to within one half of one ten thousandth of an inch in every direction for a distance of six inches from a given point.

Surface plates according to the invention have the following advantages:

1. They can not rust. No representation is made that all prior surface plates were made of iron, but iron and/or steel surface plates are still popular and widely used.

2. They will not warp either from shock or change in temperature. They can of course be broken, but not if reasonable care is used.

3. They can be made true to plus or minus .00005 in any six inches in any direction.

4. They can be easily cleaned.

5. They are highly wear-resistant. Constant use over a long period of time will not destroy their accuracy. In this respect they are superior to all prior plates known.

6. In spite of the fact that surface plates according to the invention have particles of material which is abrasive in the surface, they do not wear out cast iron or steel parts. This is surprising but is a fact which has been checked by many tests. Similarly gauge blocks with cylindrical gauging surfaces can be made according to the invention which will not abrade the pieces gauged and which will wear indefinitely.

In order to test the resistance to wear and the tendency to wear gauges and the like of surface plates in accordance with the invention, as compared with surface plates made of cast iron and surface plates made of granite, the following test was made.

Four surface plates were provided, one made of cast iron with a scraped surface, one made of granite with a lapped surface, one made of vitrified bonded aluminum oxide according to this invention with a ground and lapped surface according to this invention, and one made of vitrified bonded silicon carbide according to this invention, with a ground and lapped surface according to this invention. Eight test blocks were provided, four made of hardened tool steel and four made of cold rolled steel with cast iron wear shoes. Each block weighed 15½ lbs. and the wearing area on each block was 13 square inches, giving a load of 1.2 lbs. per square inch.

The four surface plates were placed in line and upon one side of each was placed a hardened tool steel block (hereinafter referred to as steel block) and on the other side of each was placed a cold rolled steel block with cast iron wearing shoes (hereinafter referred to as cast iron block). The steel blocks were connected together by a long bar and the cast iron blocks were connected together by a similar bar. At about the central point of these bars a pin connected them together. A long connecting rod connected this pin to a crank arm which was connected to a crank which was rotated at 90 R. P. M. The bars and the connecting rod were guided so that they did not rest upon the blocks and there was a lost motion connection between the bars and the blocks in a vertical direction to eliminate any vertical component of force from the bars either positive or negative. The crank gave a reciprocating motion of two inches to the blocks.

To check the size of the blocks a master block was made up for each set of wear blocks and of the same material. A comparator gauge was set up to these master blocks and the sizes of the test blocks were compared to the standard. Care was taken to have the blocks and standards at the same temperature when measurements were made. The blocks were measured at four points on the wearing surface. These points were carefully marked and care was taken to do all measuring at these marked points. Before the test was started all blocks were lapped flat and parallel. The surface plates were measured for any wearing by sweeping a tenth indicator over the surface where rubbing was taking place using the undisturbed portions of the surface plates as a reference plane. The test was stopped each Saturday afternoon and allowed to stand until Monday morning. Then the blocks were measured. The following tables show the results of the test:

TABLE I

Vitrified bonded aluminum oxide plate

[Total time of test, 99 days or 2376 hours. Cast iron block. All measurements are given plus or minus the original theoretical size, in decimals of an inch indicated.]

| Measuring point number | 1 | 2 | 3 | 4 |
|---|---|---|---|---|
| Measurement at start | −.0001 | −.00005 | −.0001 | −.00015 |
| Measurement at end | .0000 | −.0006 | −.0002 | +.00005 |
| Size difference | +.0001 | −.00055 | −.0001 | +.0002 |

Wear on plate, .00005.

TABLE II

Vitrified bonded aluminum oxide plate

[Total time of test, 66 days or 1584 hours. Steel block. All measurements are given plus or minus the original theoretical size, in decimals of an inch indicated.]

| Measuring point number | 1 | 2 | 3 | 4 |
|---|---|---|---|---|
| Measurement at start | +.0003 | +.0003 | +.00015 | +.00025 |
| Measurement at end | −.00005 | −.0002 | −.0009 | −.0008 |
| Size difference | −.00035 | −.0005 | −.00105 | −.00105 |

Wear on plate, .00005.

TABLE III

Vitrified bonded silicon carbide plate

[Total time of test, 99 days or 2376 hours. Cast iron block. Measurements as in Tables I and II.]

| Measuring point number | 1 | 2 | 3 | 4 |
|---|---|---|---|---|
| Measurement at start | +.0005 | +.00045 | +.00055 | +.0003 |
| Measurement at end | +.0005 | +.0001 | +.0001 | +.0001 |
| Size difference | +.0000 | −.00035 | −.00045 | −.0002 |

Wear on plate, .0000.

TABLE IV

Vitrified bonded silicon carbide plate

[Total time of test, 66 days or 1584 hours. Steel block. Measurements as in Tables I and II.]

| Measuring point number | 1 | 2 | 3 | 4 |
|---|---|---|---|---|
| Measurement at start | −.00015 | −.00025 | −.00005 | .0000 |
| Measurement at end | −.0008 | −.0009 | −.0010 | −.0006 |
| Size difference | −.00065 | −.00065 | −.00095 | −.0006 |

Wear on plate, .00005.

TABLE V

Granite plate

[Total time of test, 99 days or 2376 hours. Cast iron block. Measurements as in Tables I and II.]

| Measuring point number | 1 | 2 | 3 | 4 |
|---|---|---|---|---|
| Measurement at start | +.00045 | +.00025 | +.00045 | +.00035 |
| Measurement at end | +.0001 | −.0001 | −.00035 | +.0001 |
| Size difference | −.00035 | −.00035 | −.0008 | −.00025 |

Wear on plate, .002.

TABLE VI

Granite plate

[Total time of test, 37 days or 878 hours. Steel block. Measurements as in Tables I and II.]

| Measuring point number | 1 | 2 | 3 | 4 |
|---|---|---|---|---|
| Measurement at start | +.00015 | +.00015 | +.00005 | +.0002 |
| Measurement at end | −.0025 | −.0013 | −.0014 | −.0025 |
| Size difference | −.00265 | −.00145 | −.00145 | −.0027 |

Wear on plate, .002.

TABLE VII

Cast iron plate

[Total time of test, 49 days or 1176 hours. Cast iron block. Measurements as in Tables I and II.]

| Measuring point number | 1 | 2 | 3 | 4 |
|---|---|---|---|---|
| Measurement at start | +.0003 | +.0003 | +.00025 | +.0001 |
| Measurement at end | off scale | −.0022 | −.0013 | −.0019 |
| Size difference | −.0028+ | −.0025 | −.00155 | −.0020 |

Wear on plate, .007.

TABLE VIII

Cast iron plate

[Total time of test, 33 days or 792 hours. Steel block. Measurements as in Tables I and II.]

| Measuring point number | 1 | 2 | 3 | 4 |
|---|---|---|---|---|
| Measurement at start | .0000 | .0000 | +.00005 | +.00015 |
| Measurement at end | −.0017 | −.00095 | −.0021 | −.0021 |
| Size difference | −.0017 | −.00095 | −.00215 | −.00225 |

Wear on plate, .007.

The surface plates and wear blocks were cleaned periodically to remove residue from the wearing action and any dust and foreign matter which might influence the test.

During the test it was observed that a heavy deposit of red material collected around the specimens on the cast iron plate. It was probably iron oxide. Around the granite plate a deposit of gray and red mixed substance was observed. There was practically no residue on the aluminum oxide and silicon carbide plates. While the test was going on a decided temperature difference could be noted on the various specimens under test. The blocks sliding on the cast iron surface plate were warmest, granite was next, while aluminum oxide and silicon carbide showed no appreciable heating of the specimens. The coefficient of friction of the cast iron block on the various surface plates was experimentally determined and was found to be .219 for aluminum oxide, .233 for silicon carbide, .219 for granite, and .274 for cast iron.

In Table I at measuring point No. 1 and at measuring point No. 4 the cast iron block seems to have grown. This could be experimental error but in view of the amounts involved, one ten thousandth and two ten thousandths of an inch, it can be an actual expansion of the cast iron similar to the phenomenon known as aging. At all events this is what was found.

The average wear on the block in Table I is .00008 inch, in Table II is .00073 inch, in Table III is .00025 inch, in Table IV is .00071 inch, in Table V is .00044 inch, in Table VI is .00201 inch, in Table VII is .00221+ inch, and in Table VIII is .00176 inch. Further consolidating, the average for Tables I and II (aluminum oxide plate) is .00040 inch, the average for Tables III and IV (silicon carbide plate) is .00044 inch, the average for Tables V and VI (granite plate) is .00122 inch and the average for Tables VII and VIII (cast iron plate) is .00198 inch. Thus, using a unit of one hundred thousandth of an inch, the aluminum oxide plate wore the blocks an average of 40 units, the silicon carbide plate wore the blocks an average of 44 units, the granite plate wore the blocks an average of 122 units and the cast iron plate wore the blocks an average of 198+ units. Note further that the test was continued for much longer on the plates of this invention than on the granite and cast iron plates (because of excessive wear on the latter and on the test blocks rubbed on them). The best comparison is therefore rate of wear.

Computing the rate of wear in the above units of one hundred thousandth part of an inch per day, the results are shown in the following table.

TABLE IX

*Average wear on steel and cast iron blocks in units of one hundred thousandth of an inch per day*

|  | Cast Iron Block | Steel Block |
| --- | --- | --- |
| Aluminum Oxide Plate | .0808 | 1.06 |
| Silicon Carbide Plate | .255 | 1.075 |
| Granite Plate | .444 | 5.432 |
| Cast Iron Plate | 4.510 | 5.333+ |

Similarly computing the wear on the plates in units of one hundred thousandth of an inch per day, the results are shown in the following table.

TABLE X

*Average wear on plates by steel and cast iron blocks in units of one hundred thousandth of an inch per day*

|  | Cast Iron Block | Steel Block |
| --- | --- | --- |
| Aluminum Oxide Plate | .050 | .0757 |
| Silicon Carbide Plate | .000J | .0757 |
| Granite Plate | 2.0202 | 5.405 |
| Cast Iron Plate | 14.285 | 21.2121 |

In the several embodiments of the invention herein described the hard granular material is bonded with the vitrified bond into a strong article. The vitrified bond envelops and adheres to the individual grains of the hard granular material and holds them so that they will not loosen nor become displaced.

In connection with the examples previously given describing the manufacture of surface plates according to my invention, the grain size mentioned in the first example is No. 200 grit and finer, and in the second example No. 100 grit size is used in conjunction with No. 500 grit size. These are satisfactory grain sizes for many purposes. However, in case it is desired to employ coarser sizes to obtain larger area anvils across the surface of the plate, such as No. 14 grit size or even coarser, as previously mentioned, it is possible to substitute a certain amount of this coarser grain size for the mixture of bond and abrasive that is given in the examples.

In further description of my hard accurate surface plate which is strong enough to withstand ordinary usage and to provide an accurate anvil of great hardness and wear-resistance, in which the hard granular material is bonded with vitrified bond into a strong article, I may refer to procedures for making those vitrified-bonded aluminum oxide abrasive grinding wheels described as being of the "grade Z family" in the grade scale of grinding wheel hardness. By this is meant that the grade letter which represents the strength of the bonding in the article is the last letter in the alphabet and therefore may be said to represent the hardest and strongest bonded class of product normally available. The first grade in this family is grade Z and further grade hardness is represented by adding numbers to the grade Z designation, giving grade symbols such as Z1, Z2, Z3, Z4, Z5, Z6 and Z7 which are actually employed. These are available in different grain sizes and grain spacing. In this "garde Z family" of products corresponding to my first example, the minimum amount of bond that is available is 20.4 weight percent of the product. The upper limit of bond that may be employed is reached when the lowest volume percentage of hard granules that it is feasible to employ is used. This minimum amount of hard granules is of the order of 28 volume percent, and for a product having, say, 5 volume percent pores this corresponds to about 60 weight percent bond.

To manufacture a surface plate of lowest bond content defined as grade Z in the "grade Z family" of products, the following is an example: In this No. 3 example I use the bond composition employed in my first example. I take 160 lbs. of fused aluminum oxide abrasive of sizing between No. 30 and No. 46 grit, place it in a mixing machine of the kneader type, start the machine, add 7 lbs. of water and then screen in 43.7 lbs of raw powdered bond. After mixing for about 10 minutes to achieve homogeneity, I weight out 114 lbs. of the mixing and distribute it evenly in a cylindrical steel mold of 24⅜" diameter fitted with a bottom plate. A top plate is added and hydraulic pressure applied up to about 5 tons per square inch or enough to close the mold so as to produce a product 2¼" thick. This is then stripped from the mold, dried at about 160° F. for a day or until thoroughly dry and then fired in a kiln at heat treatment of about pyrometric cone 12, or in the vicinity of 1300° C. On firing, this bond loses about 6½ percent by weight, and the product therefore contains 20.4 weight percent bond.

As example No. 4, from the "grade Z family" of products illustrating a high bond content available in that family and making a fine-grain product, I take 64 lbs. of aluminum oxide abrasive grain of sizing about 90 to 120 mesh and 86 lbs. of the bond previously mentioned, add sufficient water to make a slurry and ball-mill in an alumina-lined mill with flint pebbles until substantially all the material will pass a 200 mesh screen. The mixing is then dried out, after which the dry cake is put into a kneading machine of conventional type with 1½ lbs. of water and mixed for about half an hour to achieve homogeneity. A surface plate is then molded from this mixture using 102 lbs. in the 24⅜" diameter mold previously described. The fired product contains 55.7 weight percent bond.

As a further example of a hard grade silicon carbide surface plate product of the type of the second example, I take 32 lbs of No. 30 sizing silicon carbide grain, 24 lbs. of No. 100 sizing silicon carbide grain, 24 lbs. of No. 500 sizing silicon carbide grain, and 34.4 lbs of glassy-type bond made according to U. S. Letters Patent No. 2,332,241, together with 5.4 lbs. of water. Mixing, pressing, drying, and firing procedures are as before, with 97 lbs. of material to make a 24⅜" diameter plate. This gives a fired product having 28.9 weight percent bond. In this case porosity of the product is about 5%.

It will thus be seen that there has been provided by this invention an article in which the various objects hereinabove set forth together with many thoroughly practical advantages are successfully achieved.

As various possible embodiments might be made of the above invention without departing from the scope of the invention, it is to be understood that all matter hereinbefore set forth or shown in the accompanying drawings is to be interpreted as illustrative and not in a limiting sense.

I claim:

1. A surface plate consisting of particles of abrasive material selected from the group consisting of aluminum oxide and silicon carbide bonded together into an integral body by a vitrified bond, said particles of abrasive material being unsintered in situ and said vitrified bond being ceramic material present in amount of from over 20 up to about 60 weight percent of the product, the vitrified bond enveloping and adhering to the particles of abrasive material, said surface plate presenting a plane gauging surface of both abrasive and bond, said surface consisting of many plane elevations of equal altitude and having pores which are depressions, said elevations having reflective surfaces, said vitrified bond comprising mainly a combination of oxides and having been vitrified by firing.

2. A surface plate consisting of particles of abrasive material selected from the group consisting of aluminum oxide and silicon carbide bonded together into an integral body by a vitrified bond, said particles of abrasive material being unsintered in situ and said vitrified bond being ceramic material present in amount of from over 20 up to about 60 weight percent of the product, the vitrified bond enveloping and adhering to the particles of abrasive material, said surface plate presenting a plane gauging surface of both abrasive and bond, said surface consisting of many plane elevations of equal altitude and having pores which are depressions, said elevations having reflective surfaces, said vitrified bond comprising mainly a combination of oxides and having been vitrified by firing under temperature and time conditions not substantially above cone 12.

3. A surface plate as claimed in claim 1, in which the abrasive is aluminum oxide.

4. A surface plate as claimed in claim 1 in which the abrasive is silicon carbide.

5. A surface plate as claimed in claim 2 in which the abrasive is aluminum oxide.

6. A surface plate as claimed in claim 2 in which the abrasive is silicon carbide.

LOWELL H. MILLIGAN.

No references cited.